United States Patent Office

Re. 24,653

Reissued May 26, 1959

24,653

BUTADIENE-COBALT CARBONYL HYDRIDE ADDUCT

William W. Prichard, New Castle County, Del., assignor to E. I. du Pont de Nemours & Company, Wilmington, Del., a corporation of Delaware No Drawing. Original No. 2,600,571, dated June 17, 1952, Serial No. 779,837, October 14, 1947. Application for reissue February 13, 1959, Serial No. 793,223

8 Claims. (Cl. 260—439)

Matter enclosed in heavy brackets [ ] appears in the original patent but forms no part of this reissue specification; matter printed in italics indicates the additions made by reissue.

This invention relates to new organic metallic compounds and more particularly to new organic cobalt compounds.

Butadiene has been reacted with iron pentacarbonyl to give a product to which was assigned the formula $$C_4H_6Fe(CO)_3$$

in which a mole of butadiene has replaced two CO groups of the pentacarbonyl. (Reihlen et al., Ann., 482, 161 (1930).)

This invention has as an object the preparation of a new organic compound of cobalt. A further object is a process for the preparation of such a compound. Another object is a hydrogenation process using said compound. A still further object is a carbonylation process using such compound. Other objects will appear hereinafter.

These objects are accomplished by the following invention wherein a new liquid compound of butadiene with cobalt carbonyl hydride is produced by reacting butadiene with cobalt carbonyl ($Co_2(CO)_8$) in the presence of a secondary alcohol under superatmospheric pressure and at a temperature within the range of 50 to 200° C. Other phases of the invention include those wherein the new organocobalt compound is employed as a hydrogenation catalyst in the hydrogenation of carboxylic acid anhydrides to the corresponding aldehyde dicarboxylates, and that wherein it is used as a catalyst in the introduction of carbonyl groups into olefinic hydrocarbons by reaction with carbon monoxide and hydrogen.

In a more detailed and preferred practice of the invention a molal excess of butadiene is reacted, at a temperature within the range 100 to 150° C., with a molal amount of cobalt carbonyl ($Co_2(CO)_8$) in the presence of at least a molal amount of a saturated non-aromatic monhydric secondary alcohol under a pressure within the range of 100 to 150 atmospheres and the resulting butadiene-cobalt carbonyl hydride adduct formed is isolated in an inert atmosphere by distillation.

The following example illustrates the invention.

EXAMPLE I

A silver-lined shaker tube of 400 cc. capacity was charged with 30.6 g. (0.0895 mole) of $Co_2(CO)_8$ and 100 g. (1.67 moles) of isopropanol. The tube was pressured to 100 atmospheres with carbon monoxide, heated to 130° C., and then butadiene was continuously injected at such a rate that 10 g. (0.185 mole) of butadiene was introduced during 30 minutes time. The tube was maintained at 130° C. for an additional 30 minutes, and then cooled. When discharged in a nitrogen atmosphere, 135 g. of dark-colored liquid was recovered from the tube. This liquid was distilled under nitrogen, the pressure being so adjusted that the distillation pot temperature did not exceed 50° C. After removal of the solvent, the pressure was lowered to 2 mm. and 11.2 g. of orange-red liquid butadiene-cobalt carbonyl hydride adduct distilled and was collected at 32–33° C. under this pressure. The product reacted rapidly with the oxygen of the air to give a black tarry mass. It was, however, stable at room temperature under a blanket of nitrogen, but at 55–60° C. it began to decompose even in the absence of air. It reacted vigorously with concentrated sulfuric or nitric acid to yield water-soluble and gaseous products. Analyses showed a cobalt content of [25.58] *29.9* and [25.88] *29.7%* (calculated for [$C_8H_7O_4Co$:Co, 26.11] *$C_7H_7O_3Co$:Co, 29.8%*). Analysis by the Orsat technique of the sulfuric acid decomposition products gave the following:

| | Percent |
|---|---|
| $C_4$ hydrocarbons, mostly butene | [17.2] *22.4* |
| Carbon oxides, mostly carbon monoxide | [69.8] *63.1* |

i.e. a ratio of carbon oxides to $C_4$ hydrocarbons of [4] *3* to 1. From the physical and chemical properties of the compound the [probable] molecular formula is

[$C_8H_7O_4Co$] *$C_7H_7O_3Co$*

Although the invention has been illustrated with isopropanol, saturated monohydric secondary alcohols in general can be employed including isopropanol, secondary butanol, pentanol-2, pentanol-3, mixtures of pentanol-2 and -3, cyclohexanol, etc. Secondary saturated monohydric alcohols aliphatic in character, i.e. non-aromatic, are preferred. The process is effective with other hydrogen donors including hydrogen, methanol and other primary alcohols, etc.

The relative proportions of the reactants can be varied widely although it is ordinarily desirable to employ two moles of butadiene with at least one mole, but preferably from 5 to 40 moles, of secondary alcohol per mole of cobalt carbonyl, ($Co_2(CO)_8$). It is desirable to use a molal excess of the secondary alcohol since this, in addition to being the hydrogen donor, also serves suitably as the solvent. The molal ratios of butadiene:cobalt carbonyl:secondary alcohol most preferred are those within the range 2:1:5 to 3:1:40 since these usually give optimum results.

The temperatures employed in the practice of the invention are generally within the range of about 50 to 200° C., preferably 100 to 150° C. Superatmospheric pressures which are used ordinarily exceed 50 atmospheres and for optimum results, pressures within the range of 100 to 150 atmospheres are employed. Because of the tendency of cobalt carbonyl to decompose at elevated temperatures to give cobalt metal and carbon monoxide, it is usually desirable, though not essential, to impress a carbon monoxide pressure of 100 to 500 atmospheres under the particular conditions of operation in order to repress the decomposition of cobalt carbonyl.

The new compound of this invention is a new and unusual type of hydrogenation catalyst in that it catalyzes the reduction of saturated carboxylic acid anhydrides to the corresponding aldehyde dicarboxylates in an atmosphere of carbon monoxide and hydrogen, and that it is also soluble in common organic solvents. This phase of the invention is illustrated in Example II below.

EXAMPLE II

A silver-lined pressure vessel of 400 cc. capacity was charged with 100 parts of acetic anhydride and 2 parts of butadiene-cobalt carbonyl hydride adduct prepared in accordance with the procedure of the above example. The vessel was closed, pressured to 200 atmospheres with hydrogen, and then to 600 atmospheres with carbon monoxide. Agitation was started and the vessel was heated to 130° C. and maintained at this temperature for 4 hours. A pressure drop from 805 to 645 atmospheres was noted during this period. After cooling the tube, a homogeneous solution was recovered which, when heated on a steam bath, changed to a purple color characteristic of cobalt acetate in acetic acid solution. This product was washed thoroughly with water to decompose any unchanged anhydride and a water-insoluble portion, 13 parts, separated. This was shown to be ethylidene diacetate, as evidenced by the boiling point of 59–62° C./9 mm. and the preparation therefrom of a 2,4-dinitrophenylhydrazone melting at 163–164° C. identical with the corresponding derivative of acetaldehyde.

By the above general procedure, substitution of propionic anhydride for the acetic anhydride gave propylidene dipropionate. Similarly anhydrides up to hexanoic anhydride may be used. It is preferred to use the anhydrides of saturated aliphatic monocarboxylic acids, particularly of the alkanoic acids of up to six carbon atoms, since these are more readily available and, in general, give higher yields of alkylidene dialkanoates.

The compound of the invention is also an active catalyst for the introduction of carbonyl groups into olefinic hydrocarbons. For example, with this catalyst and in the presence of carbon monoxide and hydrogen, cyclohexene can be readily converted to hexahydrobenzaldehyde as is illustrated in detail below.

EXAMPLE III

A silver-lined pressure vessel of 400 cc. capacity was charged with 100 parts of cyclohexene and 1 part of butadiene-cobalt carbonyl hydride adduct described in Example I. The vessel was closed, pressured to 200 atmospheres with hydrogen, and then to 600 atmospheres with carbon monoxide. Agitation was started and the vessel was heated to 150° C. and maintained at this temperature throughout the reaction. A pressure drop of 415 atmospheres was noted during 14 hours of reaction. The crude product, 129 parts or 95% of the theoretically possible weight, was distilled. No unchanged cyclohexene was recovered therefrom and the product was found to consist solely of hexahydrobenzaldehyde, its dimer and trimer.

Under the same hydrogen and carbon monoxide pressures as above, butadiene with the new compound of the invention as catalyst gave, after 1.25 hours' reaction at 135° C. a 55% yield of saturated 5-carbon monoaldehydes which consisted of approximately equal parts of n-valeraldehyde and methylethylacetaldehyde. This is described in more detail and claimed in Brooks application Serial Number 785,799, filed November 13, 1947.

Other olefins such as ethylene, propylene, isobutylene, etc., can likewise be converted to aldehydes with the new compound of this invention as catalyst.

The foregoing detailed description has been given for clearness of understanding only and no unnecessary limitations are to be understood therefrom. The invention is not limited to the exact details shown and described, for obvious modifications will occur to those skilled in the art.

What is claimed is:

1. A process for the preparation of a new compound of cobalt which comprises heating cobalt carbonyl with from 2 to 3 moles, per mole of cobalt carbonyl, of butadiene and from 1 to 40 moles, per mole of cobalt carbonyl, of isopropanol at 100–150° C. under a carbon monoxide pressure of 100 to 500 atmospheres.

2. A process wherein cobalt carbonyl is heated at 50–200° C. with from two to three moles, per mole of cobalt carbonyl, of butadiene and from one to forty moles, per mole of cobalt carbonyl, of a saturated non-aromatic monohydric secondary alcohol under a carbon monoxide pressure of 100 to 500 atmospheres.

3. A process wherein cobalt carbonyl is heated at 50–200° C. with from two to three moles, per mole of cobalt carbonyl, of butadiene and from one to forty moles, per mole of cobalt carbonyl, of a secondary, saturated, non-aromatic, monohydric alcohol under a pressure of at least 50 atmospheres.

4. A process wherein cobalt carbonyl is heated at 50–200° C. with butadiene and a secondary, saturated, non-aromatic, monohydric alcohol and the butadiene-cobalt carbonyl hydride adduct is isolated.

5. A process wherein cobalt carbonyl is heated at 50–200° C. with butadiene and a primary, saturated, non-aromatic, monohydric alcohol and the butadiene-cobalt carbonyl hydride adduct is isolated.

6. A process wherein cobalt carbonyl is heated at 50–200° C. with butadiene and methanol and the butadiene-cobalt carbonyl hydride adduct is isolated.

7. A process wherein cobalt carbonyl is heated with butadiene in the presence of a hydrogen donor of the class consisting of primary and secondary saturated, non-aromatic, monohydric alcohols and the butadiene-cobalt carbonyl hydride adduct is isolated.

8. A distillable liquid butadiene-cobalt carbonyl hydride adduct, boiling at 32–33° C. at a pressure of 2 mm. of mercury, and of the molecular formula $$[C_8H_7O_4Co]\ C_7H_7O_3Co$$

References Cited in the file of this patent or the original patent

UNITED STATES PATENTS

| | | |
|---|---|---|
| 1,637,281 | Schatz | July 26, 1927 |
| 2,211,624 | Loder et al. | Aug. 13, 1940 |
| 2,358,048 | Bitler et al. | Sept. 12, 1944 |
| 2,360,283 | Rutherford | Oct. 10, 1944 |
| 2,409,167 | Veltman | Oct. 8, 1946 |
| 2,429,501 | Yale et al. | Oct. 21, 1947 |